United States Patent [19]
Tietze

[11] 3,753,252
[45] Aug. 14, 1973

[54] DISK PACK ASSEMBLY AND METHOD OF MAKING

[75] Inventor: Armin R. Tietze, San Jose, Calif.

[73] Assignee: International Business Machines Corporation, Armonk, N.J.

[22] Filed: June 28, 1971

[21] Appl. No.: 157,201

[52] U.S. Cl............ 340/174.1 G, 117/235, 117/237
[51] Int. Cl............................................. H01f 10/00
[58] Field of Search...................... 117/235, 237, 62; 179/100.2 A, 100.2 D; 317/157.5; 340/174.1 G

[56] References Cited

UNITED STATES PATENTS

| | | | |
|---|---|---|---|
| 3,634,252 | 1/1972 | Graham | 117/235 X |
| 3,585,141 | 6/1971 | Ingersoll | 117/234 X |
| 3,586,630 | 6/1971 | Ingersoll | 117/234 X |
| 3,686,031 | 8/1972 | Balthis | 117/234 |
| 3,512,930 | 5/1970 | Bottjer et al. | 117/234 X |
| 2,793,135 | 5/1957 | Sims et al. | 117/17.5 |
| 3,531,322 | 9/1970 | Kefalas et al. | 117/237 X |
| 3,513,021 | 5/1970 | Sweeney et al. | 117/237 X |
| 3,555,557 | 1/1971 | Nacci | 117/235 |
| 3,554,798 | 1/1971 | Nacci | 117/235 |
| 3,198,657 | 8/1965 | Kimball et al. | 117/101 |
| 3,058,844 | 10/1962 | Johnson et al. | 117/237 |
| 3,534,344 | 10/1970 | Santana | 179/100.2 X |

*Primary Examiner*—William D. Martin
*Assistant Examiner*—Bernard D. Pianalto
*Attorney*—Melvyn D. Silver et al.

[57] ABSTRACT

A process for selectively affecting the magnetic properties in a magnetic particulate/resin material, such as an iron oxide-epoxy base coating as utilized on magnetic disks, disk pack assemblies and tapes, by creating an irreversible differential magnetic particle distribution in the surface of the material while maintaining the original surface topography, comprising the steps of exposing at least one preselected area of the surface for reaction with a reagent capable of converting the magnetic particulate material to a non-magnetic form, applying the reagent to the exposed areas, and removing the reagent from the preselected area of surface after a length of time sufficient to effect such conversion in the areas exposed, the reagent having the property of being substantially unreactive with the resin for the length of time of exposure.

22 Claims, 9 Drawing Figures

*INVENTOR*
ARMIN R. TIETZE

*BY* Melvyn D. Silver
ATTORNEY

DISK PACK ASSEMBLY AND METHOD OF MAKING

FIELD OF THE INVENTION

A method of generating a magnetic pattern characterized by the steps of selectively removing magnetic material only from desired areas of a previously uniform magnetic/resin base surface, resulting in magnetic/less-magnetic interfaces to define areas constituting the magnetic pattern.

BACKGROUND OF THE INVENTION

The use of magnetic tape for general storage purposes is well known in the art. Similarly, magnetic disks as utilized in disk file storage systems are well known in the art. Such tapes or disks are characterized by having a magnetic coating upon a non-magnetic substrate. Specifically, an iron oxide particulate material is embodied in an epoxy base material, and coated upon the tape or disk. Such a coating might be for example a coating as described in U. S. Pat. No. 3,058,844, D. D. Johnson, et al, and assigned to the assignee of this invention. For coating the above coating on a disk material, a process such as that disclosed in U. S. Pat. No. 3,198,657, Kimball, et al, also assigned to the assignee of this invention, is typical.

Once the tape or disk is coated, it is desired to write information into the magnetic coating and read information therefrom. Further, the magnetic head utilized to read and record such information must consistently be located over the same points on the tape or disk so as to be able to address the previously written area, to assure that the reading operation is reproducible. Thus, positioning reference tracks or positioning reference indicia are generally included in such disks, for example. Further, on both disk and tape, information storage tracks are also present. Such positioning reference patterns, and methods and apparatus for recording and detecting information on such disks for example, may be best understood by reference to U. S. Pat. No. 3,534,344, Santana, et al; U. S. Pat. No. 3,156,906, Cummins; U. S. Pat. No. 3,175,205, Auyang; U. S. Pat. No. 3,034,111, Hoagland; all of which are assigned to the assignee of the present invention. The above patents describe various forms of positioning reference patterns, sometimes referred to as servo patterns or servo tracks, and information storage patterns, sometimes referred to as data tracks.

Prior art attempts have generally been limited to creating these tracks by the step of magnetic writing via a transducer into the surface of the magnetic material. Attempts to create permanent tracks have generally attempted the same by the steps of photoetching the surface of the magnetic material, and back filling the photoetched area to fill in the holes created with a non-magnetic material. Alternatively, tracks can be initially created in the substrate carrying the magnetic material, the tracks filled in with magnetic material, and the surface repolished to define areas of magnetic and non-magnetic material. Difficulties exist with these attempts however, as they are costly and time-consuming, and grinding or etching techniques can result in tearing, lifting of the coating, and exposure of the substrate to harsh acids.

Magnetic recording, while basically satisfactory, is subject to accidental erasure, and tolerances are limited by the overlapping effect of magnetic fields. However, a uniform magnetic surface allows uniformity of flying height for a flying head transducer system, as is utilized for example in the above-cited prior art disk files. A rough or uneven surface that might be generated by the physical systems described above other than magnetic recording, would seriously alter the flying height characteristics of the magnetic transducer, resulting in an unacceptable system.

SUMMARY OF THE INVENTION

This invention has as its object the following:

a. To provide a magnetic surface having a permanent magnetic pattern therein that is not subject to accidental erasure.

b. To provide a magnetic pattern having finer tolerance control than that available by magnetic recording.

c. To provide a method of obtaining closer track-to-track spacing for magnetic recording surfaces by providing discrete areas of magnetic and less-magnetic material.

d. To provide a low cost method of creating a permanent magnetic pattern in a magnetic surface.

e. To provide a repeatable pattern generating technique permitting a flying head transducer to function upon the surface.

f. To provide a permanent magnetic pattern in a magnetic surface wherein the magnetic and less-magnetic areas have the same durability and abrasion resisting characteristics.

g. To provide all of the above with a method that does not alter the physical topography of a previously magnetic or magnetic coated surface.

h. To provide a magnetic surface in the form of a magnetic disk for use in a disk file storage system having the properties above.

i. To provide a disk pack for use in a disk file storage system having at least one surface of one disk with the properties above.

The above and other objects are met by the method and the structure of this invention. Specifically, a process is described for selectively effecting the magnetic properties in a magnetic particulate/resin surface by creating an irreversible differential magnetic particle distribution in the surface while maintaining the original topography, comprising the steps of exposing at least one preselected area of the surface to a reagent capable of converting the magnetic particulate material to a non-magnetic form; applying the reagent to the exposed preselected areas; and removing the reagent from the preselected area of the surface after a length of time sufficient to effect such conversion in the areas exposed, the reagent having the further property of being substantially unreactive with the resin for the length of time of exposure. Specifically, iron oxide particulate material in an epoxy base coating, such as epoxy phenolic or epoxy melamine, can be removed from selective areas of a magnetic coated surface by directing a reagent such as hydrochloric acid only to the areas in which magnetic material is desired to be removed. The epoxy base material, being inert to the reagent utilized, is uneffected in its characteristics while the magnetic material, being interconnected throughout the coating, is converted to non-magnetic form in the area exposed to the reagent attack. Similarly, magnetic chromium dioxide particles may be removed from a similar coating.

This and other embodiments will be more fully described and understood in the following general description when read in conjunction with the accompanying drawings.

IN THE DRAWINGS

GENERAL DESCRIPTION

Figure 1:
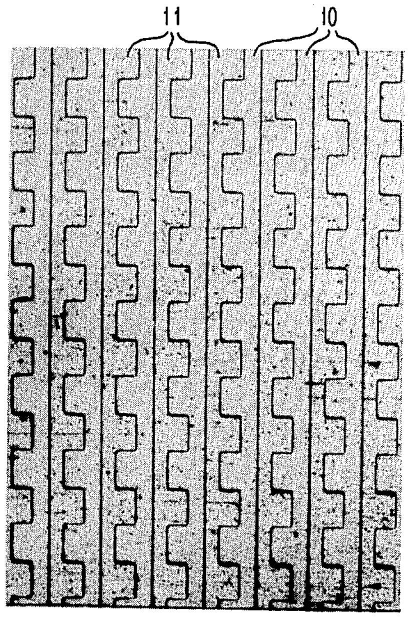
FIG. 1 is a photograph showing an enlarged view of an area of a magnetic particulate/resin coated disk having a photoresist pattern thereon in one form of a positioning reference pattern.

Magnetic particulate/resin coatings are typically used in the manufacture of magnetic tapes and disk materials. Specifically, such a coating may be utilized upon a Mylar backing in the manufacture of magnetic tape, and upon a metal substrate such as aluminum, or a glass substrate, in the manufacture of a disk for use in magnetic disk file storage systems. Similarly, such coatings are utilized in drum storage, strip storage, and other well known magnetic storage systems. Such coatings typically utilize iron oxide in a particulate form in a resin base material such as an epoxy-phenolic or epoxy-melamine base material. These coating materials are blended and coated upon a surface in a number of well known ways. These ways include ball mill blending, and application by screening, squeegeeing, doctor blading, spraying, and spin coating, as well as dipping and painting. Other techniques are also available. The thickness of the coating will vary depending on the function for which the surface is to be utilized.

The prior art patents cited above discuss in great depth the need for positioning reference systems in disk files, and information storage patterns on tapes and disks. A requirement for use of such tapes or disks, however, is that the flying head transducer must fly upon a relatively uniform surface, to avoid fluctuations across the surface resulting in contact with the surface, known as "crashing." Magnetic recording has the advantage of being able to write a pattern into a magnetic surface such as those described above, without affecting the surface topography and thus the flying height of the head.

The unusual and unexpected discovery has been made that sufficient porosity exists in the resin coating in conjunction with a sufficient interlocking or cross-linking of magnetic particles within such coating, in conjunction with the reagent diffusion coefficient in the coating, to permit the extraction or conversion of such magnetic particles from selected areas of the coating, while leaving the coating itself unaffected by the reagents used for the conversion. By so doing, surface topography is unaffected, and wear characteristics similarly are unaffected. Sharp magnetic transition regions can thus be created. The process by which this is achieved, and the resulting structure and characteristics of such structure made by this process, will best be understood by discussion of a preferred embodiment.

PREFERRED EMBODIMENT

In a preferred embodiment, a coating having a composition as described in Johnson above, is coated upon an aluminum substrate by the process of Kimball above. After curing, the coating comprises a magnetic particulate material, specifically, iron oxide, in a resinous base, particularly an epoxy-phenolic material. The iron oxide is substantially uniformly distributed throughout the coating. After spin coating, the surface generally is buffed to a very high quality finish. Specifically, the surface is flat and uniform across a 14 inch diameter disk.

Particular areas of the surface are masked for protection against a reagent that will be utilized to convert the magnetic particulate material to a non-magnetic form. Thus, a photoresist material such as Kodak KTFR, made by Eastman Kodak, Rochester, New York, is applied to the surface uniformly by well known techniques. Characteristically, the magnetic coating is approximately 50 microinches in thickness, and the photoresist coating is held to as thin a thickness as possible, consistent with a pin-hole free coating.

A photomask representative of the preselected area to be exposed is then placed adjacent to or in contact with the photoresist surface, and the photoresist exposed to radiation. Upon development, such as by KTFR developer, two areas exist upon the surface. One area has a photoresist protective coating and the other area has exposed the magnetic particulate/resin surface. FIG. 1 shows a positioning reference pattern upon the surface of a magnetic particulate/resin coated substrate. The area 10 is photoresist material after coating exposure and development. The areas 11 represent magnetic particulate/resin surface preselected to be exposed to the reagent.

After development of the pattern, the reagent is applied to the preselected exposed areas. This may be done by use of a liquid such as hydrochloric acid as the reagent, in the preferred embodiment, at 70°C. While this is preferred, other reagents such as chromic acid may be utilized. Also, a gaseous form of hydrogen chloride may also be utilized, as well as other gaseous reactants. The reactants have the property of converting the magnetic particulate material to a non-magnetic form, but do not affect or are substantially unreactive with the resin for the length of time of exposure. Thus in the case of hydrochloric acid, the reaction is $Fe_2O_3 + 6\ HCL \rightarrow 2\ FeCl_3 + 3H_2O$. Thus, the iron oxide which is magnetic is converted to non-magnetic iron chloride, which dissolves further in the water generated. The substrate is then rinsed in deionized water. At times, it may be preferable to neutralize with an ammonium hydroxide solution.

Figure 2:
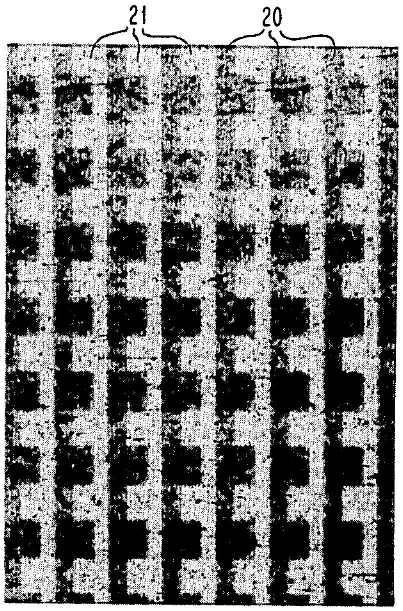
FIG. 2 shows an area similar to that shown in FIG. 1 after conversion of the magnetic particulate material and removal of the photoresist mask.
Figure 3:
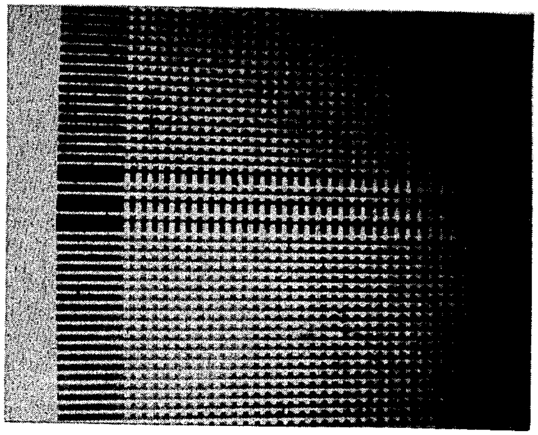
FIG. 3 is an overview of a magnetic particulate/resin coated disk surface having a series of positioning reference patterns formed therein.

The resulting pattern is shown in FIG. 2, where areas 20 are clearly distinguishable from areas 21. Areas 20 have had the iron oxide converted and removed from those areas. Areas 21 have been protected by the photoresist masking material. FIG. 3 shows an over view of the pattern of FIGS. 1 and 2, upon a greater area of a 14 inch diameter disk.

The conversion time utilized is between 10–30 seconds. It is preferable to use repeated short conversions than a single long conversion.

Certain refinements are available to the preferred embodiment above. Thus, since the reaction $2Al + 6HCL \rightarrow 2AlCl_3 + 3H_2 \phi$ also occurs, a gaseous reaction occurs, where the reagent contacts the substrate. The gas bubbles will work their way through the pores generated by conversion of the co-linking acicular material, and through the pores naturally occurring in the resinous material. Thus, the generation of bubbles is an indication that the entire depth to the substrate has been penetrated by the reagent. Consequently, it may be assumed that substantially all of the magnetic material in the preselected area has been converted to a non-magnetic form.

It has further been found that it is desirable to use a series of short conversion times rather than one long time to achieve a well defined area. It has also been found that an initial rapid conversion will cause a sharper transition at the corners of the photoresist-exposed areas. As in all photoresist techniques, a certain amount of undercutting occurs, and is predictable and may be compensated for by techniques well known in the industry.

While not all of the magnetic material in the preselected areas is removed, the amount to be removed can be determined readily by one skilled in the art as a function of the desired signal strength difference that may be obtained from the unconverted to the converted areas. Signal strength differences will be shown in reference to FIGS. 7, 8 and 9 later.

As to the process itself, various types of masks may be utilized other than photoresist. Thus, a mask may be placed directly upon the surface, such as a chromium plated steel mask and held in tight contact with the surface to expose only preselected areas. Also, step and repeat pattern masks may be used. Alternatively, a fine nozzle may be used directly to convert selected areas of the surface. The type of masking will affect the accuracy involved, but of course, is not the essence of this invention. Similarly, other reagents may be utilized, as well as other magnetic particulate material in a resinous base coating. Other resin materials may be utilized. What is important is an understanding that if a reagent is chosen that does not affect the base material for at least the time of exposure, then the magnetic particulate material may be converted due to its interlocking and cross-linking structure, whether acicular or spherical in shape, to achieve signal strength differences in different areas of a previously substantially uniform magnetic surface. Also, by diffusing the reagent through the coating, even single, isolated magnetic particles will contact the reagent and be converted. Of course, the reagent must thoroughly be removed from the surface to prevent unwanted conversion. The reagent appears to convert successive amounts of material in the resin structure by capillary action, as well as the pressure in directing or otherwise bringing the reagent to the preselected areas.

Those skilled in the art will also appreciate that the conversion rate may be affected by a pretreatment of the coating. Thus, various oils or greases may be used to fill or partially fill the surface and interior porosity. Similarly, the surface can be treated to affect the diffusion rate of the reagent. Or, various heat treatments or chemical treatments may be used to strengthen or weaken the resin coating itself.

Figure 4:
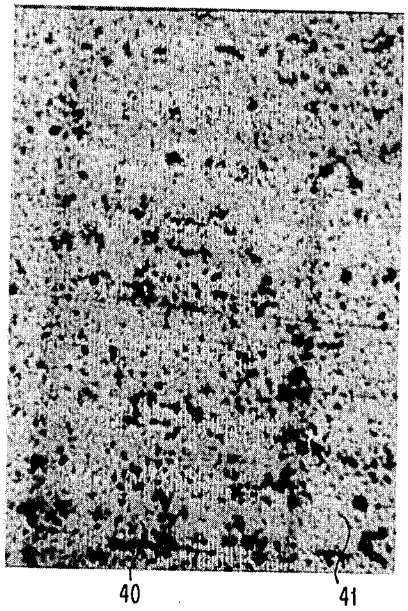
FIG. 4 is an enlarged view of a converted and unconverted area upon the magnetic surface of FIG. 1, showing uniformity of surface topography.
Figure 5:
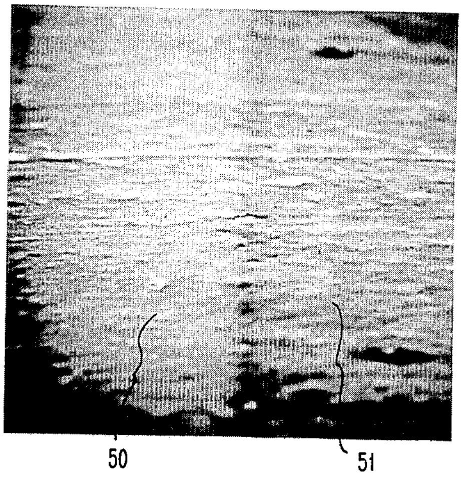
FIG 5 is a scanning electron microscope photograph showing uniformity of topography across a magnetic/non-magnetic/magnetic area.
Figure 6:
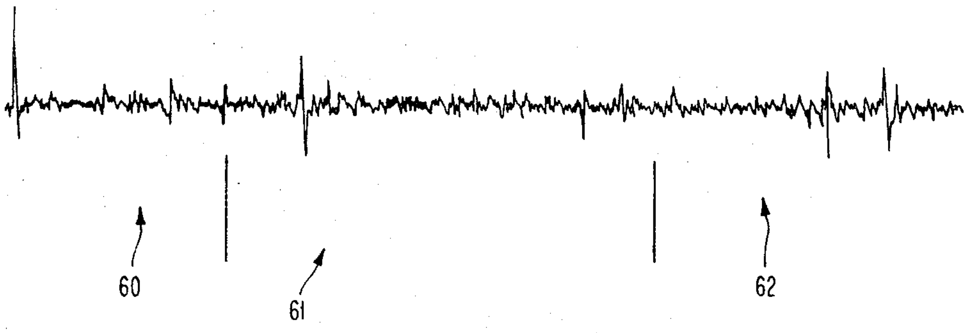
FIG. 6 shows a brush analyzer trace across the disk surface of FIG. 2, from a converted to non-converted to converted area, again showing uniformity of surface.

By not affecting the resin, the wear characteristics of the resin surface are similarly unaffected. A more porous structure is left behind, but does not collapse even though a greater porosity now exists. That this is so is shown in FIGS. 4, 5, and 6. In FIG. 4 (at greater than 600X optical magnification) converted area 40 is shown next to unconverted area 41. No visual evidence of a change in surface topography is evident. The contrast change comes about from the removal of the magnetic oxide from the surface. In FIG. 5, the converted region 51 is distinguisable from converted region 50, but no surface differences are noted. This is a scanning electron microscope photograph at a 75° angle of incidence at 1000 magnification. FIG. 6 shows a Clevite brush analyzer trace across converted region 61 and unconverted regions 60 and 62, again showing uniformity of surface characteristics.

It has also been found that after the masking material has been removed, if insufficient conversion has initially occurred, the reagent may be applied across the entire particulate/resin surface. This will begin to convert magnetic material uniformly. However, if for example 10 microinches of material is converted during the time the reagent is in contact with the surface, only 20 percent of a 50 microinch coating is converted where no prior conversion had occurred, while 100 percent of a 10 microinch remaining unconverted area in a previously converted area is removed. Thus, increases in signal strength ratios become evident by a subsequent conversion treatment.

It is also possible to define areas into preselected areas for conversion, by bombarding selected areas with high energy particles to make these areas more resistant to chemical attack. Then, the entire surface can be placed in contact with the reagent and preferential conversion rates will occur, creating the permanent pattern in the surface.

Finer accuracy than achievable with conventional photoresist may be obtained by using a two layer resist system. In this system, the resist material comprises at least two photosensitive layers, where the layer furthest from the surface is of finer resolution than the layer in contact with the surface. Thus, the surface contact layer may be a conventional photoresist such as KTFR above, and the above layer a fine grain silver halide photographic material. The photographic material is exposed and developed to a very high accuracy. This developed material then serves as a photomask for the layer in contact with the surface which is then exposed and developed to expose the preselected areas to the reagent. The reagent of course can be brought into contact with the preselected areas by dipping, spraying, immersion, or by vapor. The term "reagent" is here used to define a liquid or gaseous form, but not for example to include heat conversion techniques as might be utilized with a laser or other heat focusing devices.

While the preferred embodiment above has a coated material upon an aluminum substrate, it is clear that solid epoxy base or resin base materials (such as phonograph records) but including magnetic particulate material therein are also available. Therefore, the surface need not necessarily be upon a different substrate material, but can be upon a "substrate" of the same material as the surface itself, where the depth of penetration of conversion defines the "layer" of conversion. Also, a magnetic base material substrate may be utilized. As stated above, a positioning reference pattern or information recording pattern may be utilized.

The above method is of course utilized in the manufacture of a product. While tape and disk materials as well as drums and other configurations may be made by the method of this invention, a magnetic particulate material/resin coated disk may be most economically made by the techniques above. In particular, positioning reference patterns placed upon disks are most economically fruitful. These disks may be assembled into a disk pack assembly for use in disk files such as those mentioned above, by techniques well known in the art. Thus, one can assemble a disk pack assembly having a plurality of disks upon a hub, with at least one layer of at least one disk having an irreversible differential magnetic particle distribution defining areas of different magnetic properties made in accordance with the method above. The differential magnetic particle distribution areas may define either a positioning reference pattern, or areas for recording information. Of course, more than one disk in said pack may have such tracks, or patterns, for a plurality of purposes.

Since the resultant converted areas are relatively porous, a lubricating medium such as a lubricating oil can be forced into those areas to provide a "self lubricating" system for supplying lubricant to the disk surface for contact recording systems. Such lubricants would comprise for example, well known silicone oils.

ELECTRONIC READING

Figure 8:
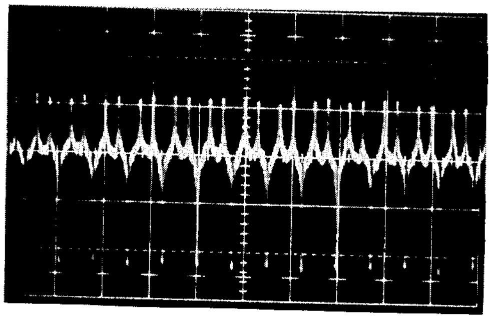
FIG. 8 shows an actual signal output schematically represented in FIG. 7, from an actual pattern as shown in FIG. 3.
Figure 9:
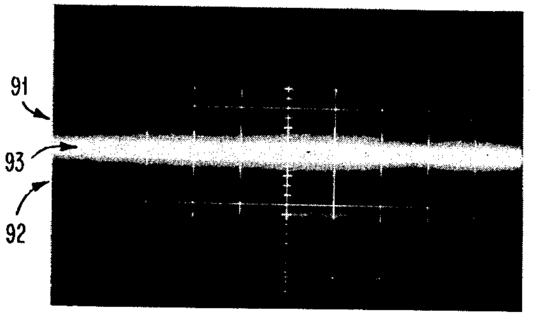
FIG. 9 shows a convoluted pattern from a rotating magnetic particulate/resin disk, having a pattern as shown in FIG. 3 about the entire surface.
Figure 7:
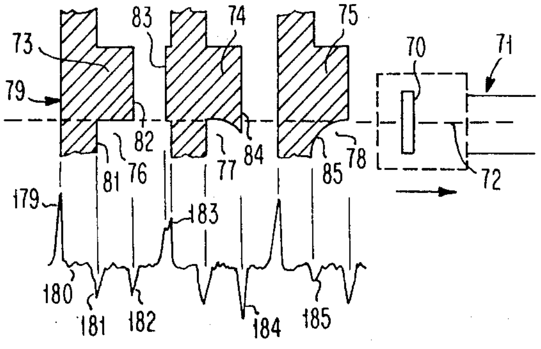
FIG. 7 shows a representation of the type of magnetic signal obtainable when utilizing the pattern formed as a positioning reference pattern.

FIGS. 7, 8 and 9 illustrate the quality of electronic signal generated by the permanent patterns in the magnetic particulate/resin surface. In FIG. 7, a magnetic transducer core 70 is shown located in an arm assembly 71 moving in the direction indicated, along a head center location 72, which passes through the area shown. Thus, half of the transducer core passes in the areas indicated as 73, 74, and 75, and half passes through the areas indicated as 76, 77, and 78. Area 73 represents a converted area, as does area 74 and 75. Area 73 represents a properly converted area, as shown by the sharpness of the transition in the corners, as contrasted to the defects shown in areas 74 and 75. Thus, as the head passes over area 73, it first comes into contact with edge 79. This creates the signal 179 shown immediately below. In the area 73, there is no change in signal strength and the area 180 is shown. As half the head passes edge 81, the signal shown as 181 is generated. As core 70 passes area 82, the second signal 182 has also generated. These signals may be utilized for a positioning reference system.

When the core 70 passes area 83, which is slightly offset from the straight line edges in area 74, the broken signal 183 is generated. Similarly, the defect indicated as 84 is shown by signal 184. Again, in area 75, the effect of the rounding defect indicated as 85 is shown by signal 185.

FIG. 8 shows an actual trace taken from a properly converted area as illustrated in FIG. 3 above, made in accordance with the teachings illustrated in FIGS. 1 and 2 in the preferred embodiment. FIG. 9 shows a convoluted image from a rotating disk showing the uniformity of height of signals illustrated by areas 91 and 92. The bright area 93 is a general noise level.

It is evident that a straight concentric pattern, or other patterns than that shown in FIGS. 1 and 2, may be generated upon the surface. The head core for magnetic reading may be centered as a positioning reference pattern, or directly over a magnetic particulate loaded area for inductive reading and recording purposes.

Thus, the objects above have been met by the method and structure of this invention. The structure of this invention is unique in that it cannot be made by other methods known in the art. No two areas on the same surface are exactly converted to the same degree, nor is it possible to otherwise obtain such complete uniformity in cross-sectional view across an entire surface, achieved here because the coating is in fact a single uniform coating without any diffusion boundaries, seal marks or otherwise differentiating marks to distinguish magnetic from less magnetic areas other than the removal of the particulate material from the continuous resinous coating. Topography has been maintained in the same condition as formerly utilized in the art, but with sharper magnetic transitions available than by inductive recording. By placing information or position referencing tracks very close together, with the limits of photoresist or conversion directing reagent means accuracy being the only limitations, very high density recording media can be made.

What is claimed is:

1. A method for selectively affecting the magnetic properties of an iron oxide magnetic particulate material dispersed in a resin binder as a coating upon a substrate by creating an irreversible differential magnetic particle distribution in the coating surface while maintaining the original surface topography comprising the steps of:

preselecting at least one area of the surface for reaction with an acid capable of converting the iron oxide to a non-magnetic form, the preselected area exposed for reaction with the acid by coating the surface with a photosensitive resist material, exposing the resist to light to react the resist through a photomask representative of the preselected area, and developing the resist;

applying the acid to the preselected area; and removing the acid from the preselected area of the surface after a length of time sufficient to effect such conversion in the areas exposed to the acid, the acid having the further property of being substantially unreactive with the resin for the length of time of exposure.

2. The method of claim 1 wherein the resist material comprises at least two photosensitive layers, the layer furthest from the surface being of finer resolution than the layer in contact with the surface, and including the step of exposing and developing the furthest layer in a preselected resist pattern to serve as a photomask for the layer in contact with the surface, then exposing and developing the layer in contact with the surface to expose the preselected area to the acid.

3. The method of claim 1 including the step of removing the resist material after the step of removing the acid.

4. The method of claim 1 wherein the preselected area is exposed to the acid by the step of directing the acid via a directing means to the preselected area.

5. The method of claim 4 wherein said directing means is of a nozzle configuration.

6. The method of claim 1 wherein said acid is of a gaseous form.

7. The method of claim 1 wherein the resin comprises an epoxy material.

8. The method of claim 7 wherein the resin comprises an epoxy-phenolic material.

9. The method of claim 1 wherein the resin comprises an epoxy-melamine material.

10. The method of claim 1 wherein said preselected area defines a positioning reference pattern.

11. The method of claim 1 wherein the substrate has a magnetic particulate material dispersed in a resin binder on both sides.

12. The method of claim 1 wherein the substrate is of disk configuration.

13. The method of claim 1 wherein the surface is of a disk configuration.

14. The method of claim 13 wherein the preselected areas define a positioning reference pattern.

15. The method of claim 13 wherein the preselected area define areas for recording information.

16. The method of claim 1 wherein the preselected areas define areas for recording information.

17. The method of claim 1 including the additional step of impregnating the preselected area with a lubricating medium.

18. An article of manufacture comprising a magnetic particulate material dispersed in a resin binder having an irreversible differential magnetic particle distribution defining areas of differing magnetic properties made by the process of claim 1.

19. The article of claim 18 wherein said article is in disk configuration.

20. A disk pack assembly comprising a plurality of disks upon a hub, at least one layer of at least one disk having an irreversible differential magnetic particle distribution defining areas of differing magnetic properties made by the method of claim 1.

21. The disk pack assembly of claim 20 wherein the areas of differing magnetic properties define a positioning reference pattern.

22. The disk pack assembly of claim 20 wherein the areas of differing magnetic properties defines areas for recording information.

* * * * *